United States Patent [19]

Pitzer

[11] 3,864,279

[45] Feb. 4, 1975

[54] TIN-PHOSPHORUS OXIDATIVE DEHYDROGENATION CATALYST

[75] Inventor: Emory W. Pitzer, Bartlesville, Okla.

[73] Assignee: Phillips Petroleum Company, Bartlesville, Okla.

[22] Filed: Sept. 6, 1973

[21] Appl. No.: 394,835

Related U.S. Application Data

[62] Division of Ser. No. 134,880, April 16, 1971, Pat. No. 3,775,508.

[52] U.S. Cl............. 252/435, 252/437, 260/290 V, 260/680 E
[51] Int. Cl............................................ B01j 11/82
[58] Field of Search.......... 260/680 E; 252/437, 435

[56] References Cited
UNITED STATES PATENTS

| | | | |
|---|---|---|---|
| 3,274,283 | 9/1966 | Bethell | 252/437 X |
| 3,501,547 | 3/1970 | Nolan et al. | 252/437 X |
| 3,513,215 | 5/1970 | Olge | 260/680 E |
| 3,557,238 | 1/1971 | Cunningham | 260/680 E |
| 3,580,969 | 5/1971 | Nolan et al. | 252/437 X |
| 3,640,901 | 2/1972 | Walker | 252/437 |

*Primary Examiner*—Patrick P. Garvin

[57] ABSTRACT

The activity of tin-phosphorus oxidative dehydrogenation catalysts is significantly improved by including a heat-volatile activity-stimulating ammonium salt in the catalyst composition prior to the catalyst particle-forming stage.

16 Claims, No Drawings

TIN-PHOSPHORUS OXIDATIVE DEHYDROGENATION CATALYST

This application is a division of copending application Ser. No. 134,880, filed on Apr. 16, 1971, now U.S. Pat. No. 3,775, 508.

BACKGROUND OF THE INVENTION

This invention relates to an improved oxidative dehydrogenation catalyst. The invention further relates to a dehydrogenation process utilizing the improved catalyst composition.

Oxidation dehydrogenation catalysts can be formed from a phosphorus component, a tin component, and, optionally as well as preferably, at least one of a Group Ia or IIa metal or metal-containing material. However, improving the activity of such catalysts is highly desirable.

SUMMARY OF THE INVENTION

According to my invention, a catalyst composition is formed form the combination of a phosphorus-containing material, a tin-containing material, and optionally as well as preferably at least one of a Group Ia or IIa metal or metal-containing material, more preferably a lithium component, further together with a heat-decomposable heat-volatile activity-stimulating ammonium salt which is added to the catalyst composition prior to the final particle-forming or shaping step. The resulting catalyst composition exhibits substantially improved oxidative dehydrogenation activity.

It is an object of my invention to provide an improved tinphosphorus oxidative dehydrogenation catalyst. It is another object of my invention to increase the activity of tin-phosphorus oxidative dehydrogenation catalysts. A further object of my invention is to improve the yield of desired product in oxidative dehydrogenation processes.

Other aspects, objects, and the several advantages of my invention will become further apparent to those skilled in the art upon the consideration of my disclosure and claims.

DETAILED DESCRIPTION OF THE INVENTION

The inclusion of a heat-decomposable heat-volatile activity-stimulating ammonium salt in preparation of tin-phosphorus oxidative dehydrogenation catalyst compositions significantly improves the effective activity of the catalysts.

In preparing my catalysts, I use a phosphorus-containing material, plus a tin-containing material, plus optionally and preferably a Group Ia or IIa metal or metal-containing material, together with the additive of my invention which is a heat-decomposable heat-volatilizable activity-stimulating ammonium salt, preferably a halogen-free ammonium salt, which is added at one or more appropriate preparation stages.

This activity-increasing component can be added to the catalyst composition at any stage prior to that of forming or shaping the catalyst particles such as by pelletizing, extrusion, or the like. The additive can be added during the very first precipitation or gel-forming step without subsequent washing; or the addition can be at a wet gel stage prior to drying which is my presently preferred method; or the addition can be after a gel-drying stage but prior to catalyst-shaping.

These heat-decomposable heat-volatile activity-stimulating ammonium salts include those which will not otherwise deleteriously affect the oxidative dehydrogenation activity and capacity of the tin-phosphorus oxidative dehydrogenation catalyst compositions. Suitable ammonium salts include the carbamate, carbonate, nitrate, nitrite, sulfate, as well as ammonium salts of carboxylic acids having up to about 12 carbon atoms per molecule including such as the formate, the hydrogen acetate, propionate, lactate, benzoate, succinate, phenolate, dodecanoate, and the like, in any of the various hydrated or partially hydrated as well as anhydrous forms, as well as mixtures, or combinations such as the carbamate acid carbonate often known as sal volatile.

Suitable phosphorus-containing materials include phosphoric acid, phosphorous oxide such as pentoxide or trioxide, phosphorus tri- and pentahalides such as phosphorous pentachloride, the Group Ia alkali metal phosphate and the Group IIa alkaline earth metal phosphates of lithium, sodium, potassium, rubidium, cesium, magnesium, and calcium, and including the various phosphate forms such as ortho-, meta-, pyro-, poly- such as hexametaphosphate, and the like, as well as mixtures.

Useful tin-containing materials include any which are soluble or dispersable in water, or in other solvent such as alcohol or ether, and include both the stannous and stannic compounds such as the stannic halides, including stannic or stannous, such as the fluoride, chloride, bromide, iodide, as well as other salt such as sulfate, acetate, oxide, nitrate, and carboxylate such as the tartrate, and the like, as well as mixtures.

The optional though preferred Group Ia or IIa component, which additional component appears to assist length of operation of the catalyst before regeneration, can be the metal itself including lithium, sodium, potassium, rubidium, cesium, beryllium, magnesium, calcium, strontium, barium, or can be a Group Ia or IIa metal-containing material such as the corresponding nitrate, halide including fluoride, chloride, bromide, iodide, the sulfate, oxalate, carbonates, bromates, oxides, hydroxides, and carboxylates such as acetates, propionates, tartrates, and the like, as well as mixtures. The more preferred alkali or alkaline earth metal component is lithium or a lithium-containing compound.

The phosphorus-containing material, the tin-containing material, and the optional Group Ia or IIa metal or metal-containing material, are combined in any conventional manner to yield active catalyst combinations suitable for oxidative dehydrogenation processes. For example, the several components can be combined using a coprecipitation gel-forming technique from aqueous or nonaqueous solutions or dispersions or suspensions, to which, if desired, minor amounts of an alkaline material can be added for gel pH adjustment; or even by intimate mixing of the components themselves without the use of additional solvents; and the like.

The concentration of the various solutions or dispersions that can be used to make my catalyst compositions can vary over wide ranges, from about 0.01 to 10 molar or more, depending on the solubility of the particular materials employed, and the particular solvent or mixture of solvents utilized. Suitable solvents or dispersants that can be employed for the combining of the several components include water, the lower alcohols, the lower ethers, hydrocarbons, ketones, esters, and the like.

Any order of mixing can be used. Generally, the catalyst compositions are formed by mixing the several components, prior to addition of my activity-stimulating salt, for intervals varying from about 1 minute to 5 hours or more in the presence or absence of a solvent or dispersant, at temperatures of about room temperature, or even less with the organic solvents, up to around 200° F., again depending upon the presence or absence of the solvent and the type thereof. Pressures ranging from less than to much greater than atmospheric pressures can be utilized. If desired, inert atmospheres can be employed, such as nitrogen. The final pH of the mixture generally is in the range of about 2 to 10. The precipitate, i.e., the gel, that forms is separated from the liquid by any conventional means such as by filtration, decantation, and the like. Thereafter, the precipitate can be washed, if desired, to remove any undesirable electrolytes, using water, including softened or deionized water as may be convenient.

Optionally, and preferably, the Group Ia or IIa, preferably lithium, component can be added after the catalyst particle has been shaped, more preferably even after calcination. Thus, the finished calcined pellet containing tin, phosphorus, and corresponding oxygen, is given a final impregnation with a soluble alkali or alkaline earth metal compound, preferably lithium, and calcined again.

The heat-decomposable heat-volatile activity-stimulating ammonium salt additive can be intimately mixed with or combined with the other materials, such as in the coprecipitation technique into a catalyst composition gel.

The presently preferred method of preparation comprises first forming a catalyst base containing the tin-containing component and the phosphorus-containing component, combined by such as precipitation techniques which result in a wet gel intermediate, and adding my activity-stimulating additive to the washed wet gel as an aqueous or other solution, or by intimately dispersing a finely divided ammonium salt into the wet gel. The additive can be added before or after washing the gel. Of course, when the heat-decomposable heat-volatile activity-stimulating ammonium salt is added before the washing step, then such washing step should be omitted so as to avoid washing out of the activity-stimulating additive.

The intimate mixing can be obtained by any conventional mixing device. The amount of added activity-stimulating ammonium salt is in the range of about 0.5 to 20, preferably about 2 to 20, weight per cent based on the final weight of the catalyst composition.

The catalyst compositions when finished and ready for use, such as in an oxidative dehydrogenation process, contain about 0.1 to 16 weight per cent phosphorus, about 15 to 75 weight per cent tin, and about 0.1 to 10, preferably 0.1 to 5, weight per cent of the group Ia or IIa metal, and balancing amounts of oxygen, each expressed as the element and based on the total weight of the final catalyst composition. The amounts of phosphorus, tin, and Group Ia or IIa metal present in the final catalyst composition together total less than 100 per cent based on the total weight of the catalyst composition. The difference between the total weight and 100 per cent being substantially combined oxygen in an amount sufficient to satisfy the valence combining requirements of the Group Ia or IIa metal, the tin, and the phosphorus, components.

The wet gel, including the heat-decomposable heat-volatile activity-stimulating salt, when added at this stage which I find preferable according to my invention, is dried by any convenient methods and under any convenient conditions such as are sufficient to reduce the moisture in the mixture to less than about 10 weight per cent. Temperatures employed should be insufficient to prematurely decompose the activity-stimulating component. Usually, the drying can be carried out at temperatures up to about 350° F. The drying can be in air, or in the presence of an inert atmosphere such as nitrogen. If desired, the ammonium salt can be added after the drying step either as a solution or dispersion, followed by further drying; or can be added by intimate mixing of a finely divided ammonium salt.

A minor amount of a lubricant frequently is added to the dried composition to assist in pelletizing catalyst compositions. The lubricant usually is a powdered polyolefin, frequently a powdered polyethylene, such as disclosed by Pitzer et al in U.S. Pat. No. 3,051,662. On calcination, the lubricant is decomposed and volatilized along with other materials which are heat-decomposable.

The dried catalyst composition is formed into particles by means of pelletizing, extrusion, and the like. The final catalyst usually is in the form of pellets of 1/16-inch to ½-inch, or granules in a 10 to 28 mesh range as defined by the U.S. Standard sieve series. The catalysts can be employed as such, or with suitable supporting or diluting materials such as alumina, eta-, gamma- or alpha-alumina or mixtures thereof, boria, beryllia, magnesia, titania, zirconia, and the like.

The dried, formed precipitate is calcined under conditions sufficient to substantially remove the heat-decomposable heat-volatile activitystimulating additive from the shaped catalytic mass or particle. Usually a calcination time of about 0.1 to 24 hours using a temperature of about 800° to 1,500° F., frequently near the temperature at which the catalyst actually is to be used in an oxidative dehydrogenation process, is suitable. During calcination, an ambient atmosphere can be utilized, or an inert atmosphere such as nitrogen can be utilized, if desired, though it does not appear to be necessary.

The drying and calcining steps not only remove moisture and minor amounts of volatile materials from the catalyst, thus preshrinking the catalyst so that it will not shrink further when used in dehydrogenation processes, but also serve to activate the catalyst.

The following example and runs shown therein demonstrate the effectiveness of my catalysts as prepared according to the process and method of my invention. The catalysts so prepared and the materials converted should be considered as illustrative and not as limitative of the scope of my invention.

EXAMPLE

The catalytic compositions in the runs following were prepared from a phosphorus-containing tin oxide gel prepared such that the amount of phosphorus was 10 weight per cent in relation ot the total composition after drying and calcining. The composition was prepared by coprecipitation of a mixture of stannic chloride and phosphoric acid by the addition thereto of ammonia. The wet gel so prepared was washed with water to remove chloride, and filtered to wet gel cake containing about 90 weight per cent water. For the control 1 as shown in Table 1 below approximately 1,000 g (gram) of the above-described wet gel was mixed with an additional 100 ml of water and homogenized. This mixture was air dried at room temperature to remove excess water, and then further dried at 350° F. for 3 or more hours. The dried material then was mixed with a minor amount of a powdered polyethylene tableting lubricant in amount equivalent to 3 weight per cent based on the dried material. This mixture was tableted in several batches with varying degrees of compaction. These tablets were heated to 1,200° F. at a rate 300° F. rise per hour and maintained at 1,200° F. for 2 or more hours, for calcination.

Runs 2, 3, and 4, exemplifying the process and method of my invention, were carried out in a manner similar as described above except that appropriate amounts of a heat-decomposable heat-volatilizable activity-stimulating salt, ammonium sulfate in runs 2 and 3 and ammonium nitrate in run 4, were added at the time the wet gel was mixed with additional water and homogenized as described above.

These catalysts then were used to convert butene to butadiene, using a single pass of butene-2 at 300 volume space velocity, a 4:1 air: butene-2 ratio, and an 18:1 steam:butene-2 ratio.

Table I

| Run No. | Activity-Stimulating Salt Added | Amount, Wt % | Yield of Butadiene 900° F. | 1000° F. |
|---|---|---|---|---|
| 1 | None | 0 | 29 | 35 |
| 2 | Ammonium sulfate | 5 | 38 | 40 |
| 3 | Ammonium sulfate | 15 | 38 | 40 |
| 4 | Ammonium nitrate | 5 | 37 | 42 |

The yields in Table I above were taken from a plot of yield versus tablet strength at a tablet strength of 8 pounds. Since it is desirable to have a high strength or hard catalyst for commercial production purposes, the catalyst tablet for the runs of the invention actually were made at a higher compaction so that the finished tablets were equal to the control tablets in hardness, even though it is known that higher compaction generally reduces catalyst activity. If the catalyst samples of both control run 1 and runs 2, 3, and 4 of the invention were compared at the same degree of compaction, the results would be even more favorable.

The single pass yields given in Table I above demonstrate conclusively that the substantial increase in yield obtained by providing in the catalyst preparation a heat-decomposable heat volatile activity-stimulating ammonium salt at a stage prior to a catalyst-forming step results in substantial increase in yields of butadiene in use of the catalyst of my invention in an oxidative dehydrogenation process.

My catalysts can be used not only in an oxidative dehydrogenation process as exemplified above, but in any oxidative dehydrogenation process in which a material to be converted is an alkene, a cycloalkene, an alkylpyridine, or an alkyl-substituted aromatic, using elevated contacting temperatures, and a moelcular oxygen-containing gas, with or without the presence of steam.

Suitable alkenes contain from 3 to 10, more usually from 4 to 6, carbon atoms per molecule, and include propylene, n-butene, n-pentene, the decenes, and the like. The alkadienes contain from 4 to 10 carbon atoms per molecule, inclusive, such as butadiene, isoprene, and the like. The cycloalkenes contain from 4 to 10 carbon atoms per molecule, preferably from 4 to 6, such as cyclobutene, 3-isopentylcyclobutene, and the like.

The alkyl aromatics and alkyl pyridines contain from 1 to 4, more usually 1 to 2, alkyl groups per ring, with the rings containing from 5 to 8 carbon atoms per ring; such alkyl-substituted pyridines or aromatics should contain at least 1 alkyl group having at least 2 carbon atoms per alkyl group. Examples of suitable materials include ethyl benzene, the n- and isobutyl benzenes, hexyl benzene, ethyl pyridine, 2-ethyl-5-hexyl pyridine, and the like.

Exemplary reactions according to the process of my invention include the formation of 1,3-butadiene from the butenes, isoprene from 2-methylbutenes, styrene from ethylbenzene, furan from butadiene, and the like.

The amount of catalyst employed can vary widely depending upon materials present and the conversion and selectivity desired, though the amount chosen will be that which for the given reaction is in effective amount to produce the desired dehydrogenation results.

The molecular oxygen-containing gas employed can be present as such, or can be utilized with inert diluents including nitrogen and the like. Suitable molecular oxygen-containing gases include air, flue gases containing residual oxygen, or other available gases of suitable nature. Substantially pure oxygen can also be employed where it is desired.

The operating conditions for the oxidative dehydrogenation process utilizing the improved catalysts of my invention can vary widely, generally include a temperature of from about 700° to 1,300° F., a pressure of about 0.05 to 250 psia, and oxygen:gaseous organic compound feed volume ratio of about 0.1:1 to 3:1, and where steam is used, a steam:organic compound feed volume ratio of about 0.1:1 to 50:1. The organic compound feed space rate measured in volumes of organic compound vapor:volume of catalyst: hour at 32° F. and 15 psia can be from about 50 to 5,000.

Processes of conversion which utilize the improved catalysts I have described ordinarily are conducted by forming a mixture, usually preheated, of organic compound feed, steam where used, and the oxygen-containing gas or gases, and passing this admixture over the catalyst composition particles at desired temperature and pressure relationships. Separation and recycle of unconverted organic compound feed can be employed where desired. Converted products obtained according to the process of my invention are useful within various processes such as polymerization and the like, such as of butadiene to polybutadiene, isoprene to polyisoprene.

Reasonable variations and modifications of my invention are certainly possible within the scope of my disclosure including the specification and claims, yet without departing from the reasonable scope and intended spirit thereof.

What is claimed is:

1. A method of preparing a catalyst composition consisting essentially of phosphorus, tin, and oxygen, said catalyst composition containing from about 0.1 to about 16 weight percent phosphorus and from about 15 to about 75 weight percent tin which comprises:
   1. forming a wet gel catalyst base consisting essentially of at least one tin-containing component and at least one phosphorus-containing component, 2. admixing said wet gel catalyst base with at least one heat-decomposable, heat-volatile, activity-stimulating ammonium salt so that the resulting admixture contains from about 2 to about 20 weight percent of said ammonium salt based on the total weight of said catalyst composition, and 3. calcining said admixture at a temperature in the range of about 800° to about 1,500°F for a time in the range of about 0.1 to about 24 hours to remove said ammonium salt, said ammonium salt being selected from the group consisting of ammonium carbamate, ammonium carbonate, ammonium nitrate, ammonium nitrite, ammonium sulfate, and ammonium salts of carboxylic acids having up to 12 carbon atoms per molecule.

2. A method in accordance with claim 1 wherein said ammonium salt comprises ammonium sulfate.

3. A method in accordance with claim 1 wherein said ammonium salt comprises ammonium nitrate.

4. A method in accordance with claim 1 wherein said ammonium salt is admixed with said wet gel catalyst base during the formation of said wet gel catalyst base, and the resulting admixture is calcined without washing said admixture.

5. A method in accordance with claim 1 wherein said wet gel catalyst base is washed before said ammonium salt is admixed therewith, and the resulting admixture is then calcined without wasthin said admixture.

6. A method in accordance with claim 1 wherein said admixture is dried at a temperature insufficient to prematurely decompose said ammonium salt, and the thus dried admixture is formed into particles and then subjected to said step of calcining.

7. A method in accordance with claim 1 wherein said wet gel catalyst base further contains at least one metal selected from the group consisting of lithium, sodium, potassium, rubidium, cesium, beryllium, magnesium, calcium, strontium, and barium; said at least one metal being present in the elemental form thereof or in the form of a compound thereof selected from the group consisting of nitrate, halide, sulfate, oxalate, carbonate, bromate, oxide, hydroxide, carboxylate and mixtures thereof; said metal, expressed in elemental form, being present in said wet gel catalyst base in an amount sufficient to provide from about 0.1 to about 10 weight percent of the calcined catalyst composition.

8. A method in accordance with claim 1 wherein said phosphorus-containing component is a phosphoric acid, a phosphorous oxide, a phosphorous halide, a Group Ia alkali metal phosphate, or a Group IIa alkaline earth metal phosphate; and said tin-containing component is a stannous or stannic halide sulfate, acetate, oxide, tartrate, or nitrate.

9. A method in accordance with claim 1 wherein the thus calcined tin-phosphorus catalyst composition is treated with a lithium containing material and the thus treated composition is then subjected to calcining conditions, said lithium containing material being elemental lithium or at least one compound thereof selected from the group consisting of nitrate, halide, sulfate, oxalate, acetate, carbonate, propionate, tartrate, bromate, oxide, and hydroxide, said lithium containing material being employed in an amount to provide from about 0.1 to about 10 weight percent elemental lithium in the thus calcined treated composition.

10. A method in accordance with claim 1 wherein said wet gel catalyst base is formed by admixing said at least one phosphorus-containing component, said at least one tin-containing component, and at least one member of the group consisting of Group Ia components and Group IIa components for a time in the range of about 1 minute to about 5 hours at a temperature of up to 200°F., in the presence of at least one solvent selected from the group consisting of water, lower alcohols, lower ethers, hydrocarbons, ketones, and esters, said Group Ia or IIa component being a Group Ia or IIa metal or metal-containing compound, said Group Ia or IIa metal being lithium, sodium, potassium, rubidium, cesium, beryllium, magnesium, calcium, strontium, or barium, and said Group Ia or IIa metal-containing compound being a nitrate, halide, sulfate, oxalate, acetate, carbonate, propionate, tartrate, bromate, oxide, or hydroxide, and wherein said catalyst composition contains from about 0.1 to about 10 weight percent of said Group Ia or IIa metal, based on the total weight of said catalyst composition.

11. A method in accordance with claim 1 wherein the thus calcined tin-phosphorus catalyst composition is treated with at least one metal component and the thus treated composition is then subjected to calcining conditions; said metal component being in the form of elemental metal or in the form of a compound thereof selected from the group consisting of nitrate, halide, sulfate, oxalate, acetate, carbonate, propionate, tartrate, bromate, oxide, and hydroxide; said elemental metal being selected from the group consisting of lithium, sodium, potassium, rubidium, cesium, beryllium, magnesium, calcium, strontium, and barium, wherein said thus calcined treated composition contains from about 0.1 to about 10 weight percent of said metal component considered as elemental metal.

12. A method in accordance with claim 1 wherein said tin-containing component is stannic chloride; said phosphorus-containing component is phosphoric acid; and said ammonium salt is ammonium sulfate.

13. A method in accordance with claim 1 wherein said tin-containing component is stannic chloride; said phosphorus-containing component is phosphoric acid; and said ammonium salt is ammonium nitrate.

14. A catalyst composition prepared in accordance with claim 1.

15. A catalyst composition prepared in accordance with claim 9.

16. A catalyst composition prepared in accordance with claim 11.

* * * * *